United States Patent
Duchatelle et al.

(10) Patent No.: US 8,038,386 B2
(45) Date of Patent: Oct. 18, 2011

(54) INTERMEDIATE CASING OF A TURBOJET AND A TURBOJET

(75) Inventors: Thierry François Maurice Duchatelle, Creteil (FR); Philippe Verseux, Draveil (FR)

(73) Assignee: SNECMA, Paris (FR)

( * ) Notice: Subject to any disclaimer, the term of this patent is extended or adjusted under 35 U.S.C. 154(b) by 594 days.

(21) Appl. No.: 12/245,183

(22) Filed: Oct. 3, 2008

(65) Prior Publication Data

US 2009/0104027 A1    Apr. 23, 2009

(30) Foreign Application Priority Data

Oct. 4, 2007   (FR) ...................... 07 06977

(51) Int. Cl.
  *F04D 29/06* (2006.01)
(52) U.S. Cl. ...................... 415/122.1; 415/144; 415/175
(58) Field of Classification Search .......... 415/110–111, 415/118, 122.1, 144, 175; 60/226.1, 267, 60/802, 39.08
  See application file for complete search history.

(56) References Cited

U.S. PATENT DOCUMENTS

| | | | |
|---|---|---|---|
| 2,566,049 A | 8/1951 | Williams | |
| 3,200,753 A * | 8/1965 | Di Stefano et al. ........... | 417/407 |
| 3,271,949 A * | 9/1966 | Jones et al. ..................... | 60/791 |
| 3,907,386 A | 9/1975 | Kasmarik et al. | |
| 4,693,669 A * | 9/1987 | Rogers, Sr. ................... | 415/143 |
| 5,895,203 A * | 4/1999 | Klein ......................... | 415/122.1 |
| 6,904,885 B2 * | 6/2005 | Osband ..................... | 123/195 R |
| 2008/0310958 A1 * | 12/2008 | Bader et al. ................ | 415/208.2 |
| 2011/0110766 A1 * | 5/2011 | Moore et al. ................. | 415/158 |

FOREIGN PATENT DOCUMENTS

GB   926947   5/1963

* cited by examiner

*Primary Examiner* — Gary F. Paumen

(74) *Attorney, Agent, or Firm* — Oblon, Spivak, McClelland, Maier & Neustadt, L.L.P.

(57) ABSTRACT

The present invention relates to an intermediate casing of a turbojet comprising, between an inner hub and an outer cylindrical shroud, a plurality of radial arms at least one of which is hollow, a radial transmission shaft for driving the auxiliary machines being mounted rotatably in said radial arm, a first end of the transmission shaft passing through the inner hub and the second end passing through the outer cylindrical shroud. The housing is notable in that the inner volume consists of a single compartment housing the transmission shaft and forming a passageway for a lubrication fluid.

8 Claims, 2 Drawing Sheets

INTERMEDIATE CASING OF A TURBOJET AND A TURBOJET

The present invention relates to the field of turbojets, notably of turbojets with multiple flows and with bypass flow in particular.

A bypass flow turbojet in civil applications for powering commercial aircraft providing passenger or freight traffic usually comprises a front fan rotor whose outgoing flow is separated into two concentric flows, main and bypass. The main flow is guided toward the turbine engine which notably drives the fan rotor; the bypass flow is either exhausted directly into the atmosphere while supplying an essential part of the thrust, or mixed downstream of the turbine with the hot main flow before being exhausted.

The turbine engine comprises additional compressor stages, a combustion section and several turbine stages, the last of which drives the fan.

The equipment ensuring the operation of the engine is controlled, supplied or in communication with the outside of the engine by a set of cables, transmission shafts and pipes described by the general term auxiliary services. The auxiliary services therefore include:

pipes carrying hydraulic fluids such as feeds or returns of lubrication or cooling oil;
mechanical power transmission members, for driving the gears of the auxiliaries notably;
ventilation channels;
electrical cables such as those connected to the various sensors for example.

The auxiliary services are usually partly housed in the structural arms of the intermediate casing for the radial crossing of the primary and bypass flows. The intermediate casing is a stator element in the form of a wheel with a portion forming a hub and an outer cylindrical shroud, communicating with an auxiliary gearbox, better known as the AGB. These two elements are connected via a plurality of structural radial arms.

Because the structural arms pass through the flows of propulsion gases, it is desirable to reduce the number and space requirement thereof. For large engines of large diameter, the passageway for the auxiliary services in the arms does not pose a particular problem because the available space is sufficient. The dimension and number of arms make it possible to arrange passageways with cross sections suitable for the dimensional stresses of the auxiliary services. It is possible, for example, to house an oil pipe in one arm and an auxiliary machine drive shaft in an adjacent arm. The problem is awkward to solve when the engine has a smaller diameter. In this case, the propulsion gas stream has a smaller cross section and, so as not to penalize the aerodynamic performance, it becomes necessary to reduce the number of arms and the dimensions of the latter. However, whether the engine is of large or medium power or diameter, the auxiliary services remain the same with substantially the same space requirement. The result of this is less space available for the auxiliary services in the case of an engine of smaller cross section.

For example, in FIG. 1, an arm 300 of the prior art is formed of a part obtained by casting metal in a mould of appropriate shape. It is fitted with an oil tube 310 housed in drill holes 305, 315 made in the top and bottom transverse walls of the arm. These various elements require the installation of sealing means in the border zones at the drill holes. The maintenance of this tube 310 cannot be easy if the installation of the assembly into the aircraft does not allow good accessibility. This figure shows that, despite its relatively small cross section relative to the passageway available in the arm, the tube occupies a relatively large part thereof because of the free space that has to be left with the walls. The induced space requirements provides concomitantly less available space for another auxiliary service. Notably, a rotating auxiliary machine drive shaft would be too close to the tube.

According to patent application FR2899272, an intermediate casing is known whose arm is a cast part with a sealed longitudinal partition arranging a first passageway for the oil pipes and a second passageway for housing the auxiliary services and, more particularly, a mechanical transmission shaft. The seal of the partition makes it possible to associate the fluid passageway with that of other auxiliary services without risking contamination from one to the other which would be likely to cause malfunctions.

Because the partition is cast, the configuration of the passageways in the arm is definitively fixed, preventing any modification and rearrangement of the auxiliary services. In addition, the space requirement of such an arm remains considerable, penalizing the aerodynamic performance of the engine.

The object of the present invention is therefore the passing of auxiliary services through the intermediate casing and more particularly in the structural arm of said casing so as to maintain minimal dimensions, while optimizing the space inside the arm.

In order to alleviate some of these disadvantages, the applicant proposes an intermediate casing comprising, between an inner hub and an outer cylindrical shroud, a plurality of radial arms at least one of which is hollow and forms a passageway for one or more auxiliary services of the turbojet, a radial transmission arm for driving the auxiliary machines being mounted rotatably in said radial arm, a first end of the transmission shaft passing through the inner hub and the second end passing through the outer cylindrical shroud, the casing being remarkable in that the inner volume of the radial arm consists of a single compartment housing the transmission shaft and forming a passageway for a lubrication fluid.

The casing according to the invention makes it possible to combine, within a single compartment of restricted size, the passageway for the lubrication oil with that of the shaft which were traditionally separate. Such a casing, with arms of reduced dimensions, makes it possible to reduce the frontal areas of the arms in the main and bypass flows.

Calibrated clearances are arranged between the ends of the transmission shaft and the openings formed in the inner hub and the outer cylindrical shroud respectively. The calibrated clearances make it possible to regulate the flow of lubrication fluid between a front enclosure of the turbojet—delimited partly by the inner hub—, the inner volume of the radial arm and the accessory gearbox—delimited in part by the outer cylindrical shroud—.

According to another feature of the invention, the casing comprising at least one annular partition for separating gas flows into two concentric annular flows (P and S), the radial arm comprises a first portion C1 passing through the main flow P, a second portion C2 passing through the bypass flow S, the first portion C1 of the arm being narrower than the second portion C2.

The thickness of the arm is adapted so that the latter occupies a minimum volume in the stream of the main flow whose cross section is small.

The portion of the radial arm passing through the bypass flow (S) comprises longitudinal reinforcing ribs, that preferably have holes in them.

The reinforcing ribs make it possible to reinforce the stiffness of the arm while preventing it from buckling it, that is to say a compression of the arm at its ends. The ribs advantageously have holes in them so as not to increase the weight of the radial arm.

Again preferably, the transmission shaft is one-piece.

The invention also relates to a turbojet comprising an enclosure with bearings, an accessory gearbox and an intermediate casing wherein said radial arm places said enclosure in communication with said auxiliary gear box.

Preferably, the accessory gearbox comprises an oil reservoir which is placed in communication with the enclosure by the radial arm.

An embodiment of the invention is now described with reference to the appended drawings in which.

Figure 1:
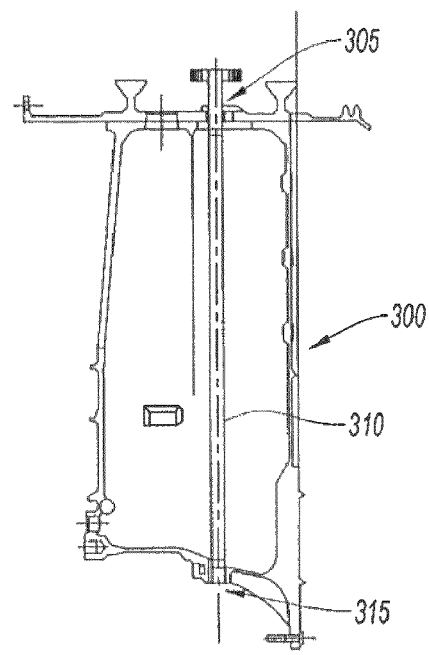
FIG. 1 shows in longitudinal section an arm of an intermediate casing, according to the prior art.
Figure 2:
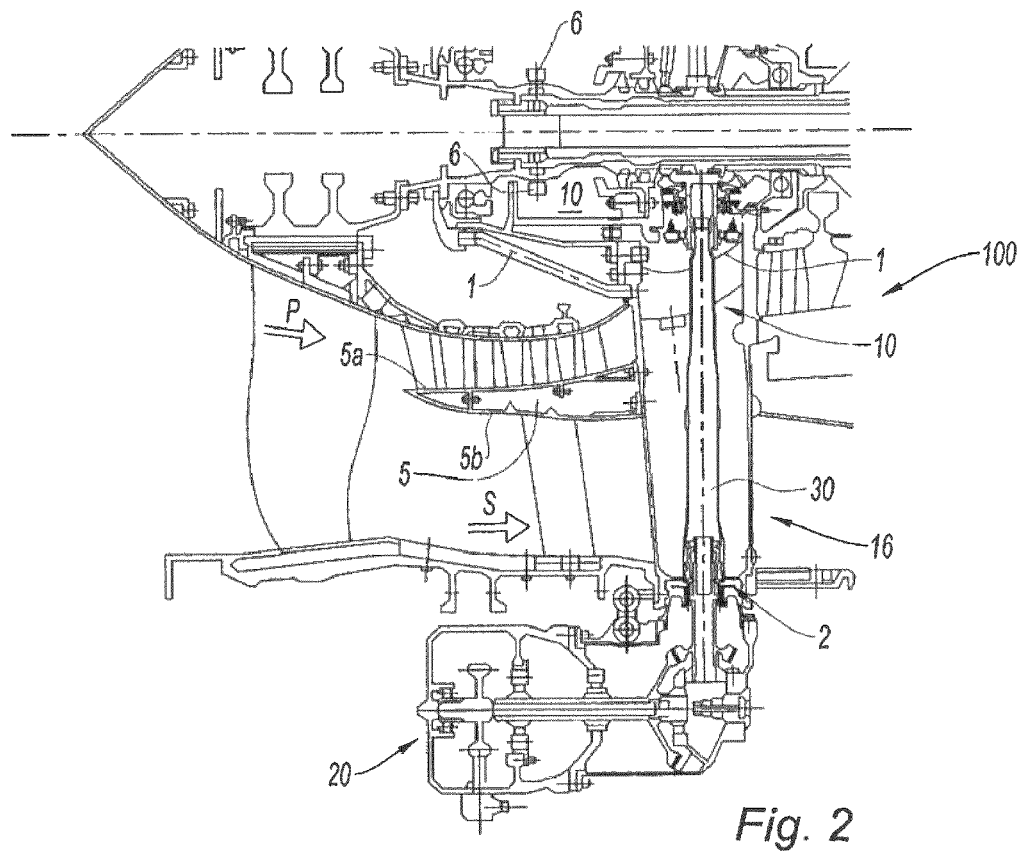
FIG. 2 shows in longitudinal section a turbojet with a casing according to the invention.

FIG. 2 shows an intermediate casing 100, with a central hub 1 and an outer shroud 2, connected via a radial arm 16 placed vertically in the lower portion. The central hub 1 partially delimits the volume of a front enclosure 10 of the turbojet in which bearings 6 are mounted supporting the low pressure (BP) and high pressure (HP) rotor shafts. An accessory gearbox 20 is mounted on the cylindrical outer shroud 2 of the casing 100. The auxiliary machines are driven by a one-piece transmission shaft 30 mounted in the radial arm 16 and arranged so as to take power from the BP and HP rotor shafts supported in the front enclosure 10.

A separator 5 delimits the main flow P from the bypass flow S. This separator is formed of two divergent annular walls 5a and 5b traversed by the radial arm 16, the main flow in this instance having a smaller section than the bypass flow.

Figure 3:
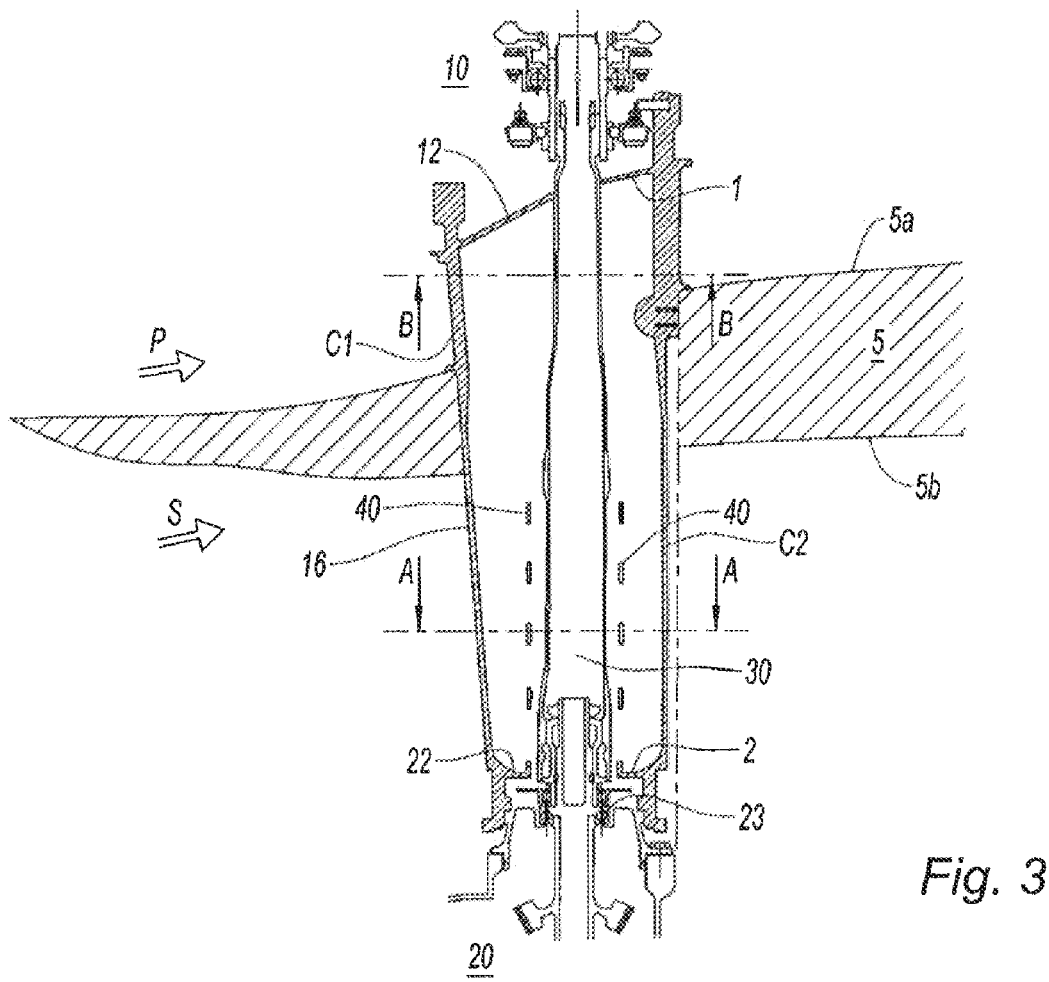
FIG. 3 shows in longitudinal section an arm of the intermediate casing of FIG. 2.

FIG. 3 shows a section of the casing 100 of FIG. 2 in the vertical plane passing through the axis of the engine and the lower arm 16. This section shows the arm 16, the shroud 2, the hub 1 and the walls 5a and 5b of the separator inside the casing. The main flow is represented by the arrows P; the bypass flow by the arrows S.

Figure 4A:
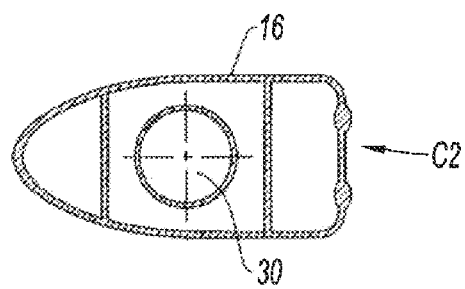
FIG. 4A represents a view in axial section of the arm of FIG. 3 along the sectional plane A-A.
Figure 4B:
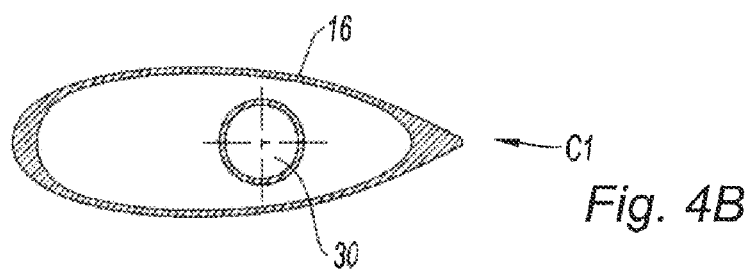
FIG. 4B represents a view in axial section of the arm of FIG. 3 along the sectional plane B-B.

The hollow arm 16 is formed of two radial portions in the extension of one another. A first portion C1 passes through the main flow P, a second portion C2 passes through the bypass flow S. They have appropriate geometry. Therefore, the first portion C1 of the arm is narrower than the second portion C2. This difference of geometry is more visible in the sectional views of the radial arm 16 shown in FIGS. 4A and 4B.

The geometry of the transmission shaft 30 is also adapted, the diameter of the shaft 30 being greater in the portion C2 of the radial arm 16 than in the portion C1.

The inner volume of the radial arm 16 consists of a single compartment making it possible to carry a lubrication fluid, such as oil. The lubrication fluid is in direct contact with the walls of the arm 16 and with the outer surface of the transmission shaft 30. The radial arm 16 places the front enclosure 10 in communication with the accessory gearbox 20 in order to lubricate the bearings 6 and thereby limit their wear and their heating.

In the present example, the inner volume of the radial arm 16 makes it possible to discharge the oil originating from the front enclosure 10 toward the accessory gearbox 20.

With reference to FIG. 3, the transmission shaft 30, mounted in the compartment filled with lubrication fluid, passes through the openings formed respectively in the transverse surfaces 12, 22 of the inner hub 1 and of the outer cylindrical shroud 2, the ends of the shaft 30 being respectively mounted in guide bearings 13, 23 fastened in the front enclosure 10 and the accessory gearbox 20.

The clearances between the transmission shaft 30 and the openings in the transverse walls 12, 22 are calibrated to regulate the flow of lubrication fluid between the front enclosure 10, the inner volume of the radial arm 16 and the accessory gearbox 20. This is made possible in manufacture by putting in place an appropriate class of cleanliness, equivalent notably to that of the oil enclosure. Also, it is less critical because the transmission shaft is a part with no intermediate bearing.

The reinforcing ribs 40 formed longitudinally and inside the radial arm 16, make it possible to reinforce the rigidity of the arm 16. The reinforcing ribs 40 advantageously have holes in them so as not to increase the weight of the radial arm 16 and to do so without affecting the rigidity of the assembly.

The radial arm 16 may also place the front enclosure 10, comprising the bearings 6 supporting the BP and HP shafts, in fluidic communication with an oil reservoir placed in the accessory gearbox 20 in order to ensure the oil discharge, supply or pressurization of the front enclosure 10.

Other auxiliary services may be incorporated into the radial arm such as cables, pipes or additional shafts.

The invention claimed is:

1. An intermediate casing of a turbojet comprising, between an inner hub and an outer cylindrical shroud, a plurality of radial arms at least one of which is hollow, a radial transmission shaft for driving the auxiliary machines being mounted rotatably in said radial arm, a first end of the transmission shaft passing through the inner hub and the second end passing through the outer cylindrical shroud, a casing wherein the inner volume of the radial arm consists of a single compartment housing the transmission shaft and forming a passageway for a lubrication fluid.

2. The intermediate casing as claimed in claim 1, wherein calibrated clearances are arranged between the ends of the transmission shaft and openings formed in the inner hub and the outer cylindrical shroud respectively.

3. The intermediate casing as claimed in claim 1, comprising at least one annular partition for the separation of gas flows into two concentric annular flows, primary and bypass respectively, wherein the radial arm comprises a first portion passing through the main flow, a second portion passing through the bypass flow, the first portion of the arm being narrower than the second portion.

4. The intermediate casing as claimed in claim 3, wherein the portion of the radial arm passing through the bypass flow comprises longitudinal reinforcing ribs.

5. The intermediate casing as claimed in claim 4, wherein the reinforcing ribs have holes in them.

6. The intermediate casing as claimed in claim 1, wherein the transmission shaft is one-piece.

7. A turbojet comprising an enclosure with bearings, an accessory gearbox and an intermediate casing as claimed in claim 1 wherein said radial arm places said enclosure in communication with said accessory gearbox.

8. The turbojet as claimed in claim 7, wherein the accessory gearbox comprises an oil reservoir that is placed in communication with the enclosure by the radial arm.

* * * * *